United States Patent [19]

Moore

[11] Patent Number: 5,343,527
[45] Date of Patent: Aug. 30, 1994

[54] HYBRID ENCRYPTION METHOD AND SYSTEM FOR PROTECTING REUSABLE SOFTWARE COMPONENTS

[75] Inventor: James W. Moore, Potomac, Md.

[73] Assignee: International Business Machines Corporation, Armonk, N.Y.

[21] Appl. No.: 141,735

[22] Filed: Oct. 27, 1993

[51] Int. Cl.$^5$ .............................................. H04L 9/00
[52] U.S. Cl. .......................................... 380/4; 380/25; 380/30
[58] Field of Search ...................... 380/3, 4, 22, 23, 24, 380/25, 28, 29, 30, 49, 50

[56] References Cited

U.S. PATENT DOCUMENTS

| | | | |
|---|---|---|---|
| 4,658,093 | 4/1987 | Hellman | 380/25 |
| 4,791,565 | 12/1988 | Dunham et al. | 364/200 |
| 4,924,515 | 5/1990 | Matyas et al. | 380/25 |
| 4,953,209 | 8/1990 | Ryder et al. | 380/23 |
| 5,007,082 | 4/1991 | Cummins | 380/4 |
| 5,050,212 | 9/1991 | Dyson | 380/25 |
| 5,050,213 | 9/1991 | Shear | 380/25 |
| 5,073,934 | 12/1991 | Matyas et al. | 380/30 |
| 5,073,935 | 12/1991 | Pastor | 380/30 |
| 5,136,647 | 8/1992 | Haber et al. | 380/49 |
| 5,138,712 | 8/1992 | Corbin | 395/700 |
| 5,142,578 | 8/1992 | Matyas et al. | 380/21 |
| 5,189,700 | 2/1993 | Blandford | 380/23 |
| 5,199,066 | 3/1993 | Logan | 380/4 |
| 5,214,702 | 5/1993 | Fischer | 380/30 |
| 5,231,668 | 7/1993 | Kravitz | 380/28 |

OTHER PUBLICATIONS

IBM System Journal vol. 29, No. 2, 1990 "Repository Manager Technology" J. M. Sagawa.
IEEE Computer, Sep. 1986, "A Proposed Standard Format for RSA Cryptosystems", Zimmerman.

Primary Examiner—Tod R. Swann
Attorney, Agent, or Firm—Mark A. Wurm

[57] ABSTRACT

Disclosed is a system and method for providing a reuser of a software reuse library with an indication of whether or not a software component from the reuse library is authentic and whether or not the software component has been modified. The system and method disclosed provides a reuser with assurance that the software component retrieved was placed in the reuse library by the original publisher and has not modified by a third party. The system and method disclosed uses a hybrid cryptographic technique that combines a conventional or private key algorithm with a public key algorithm.

20 Claims, 10 Drawing Sheets

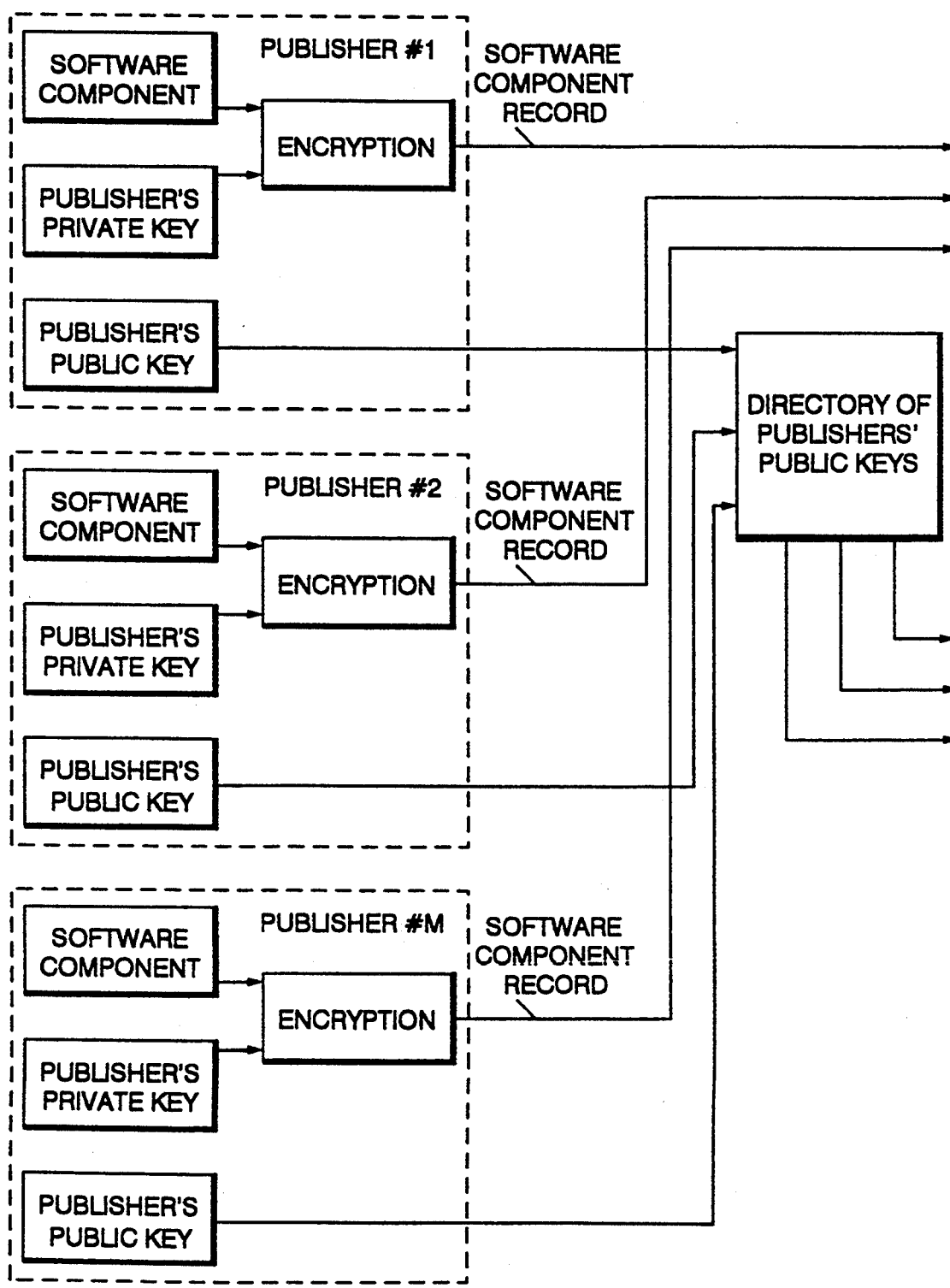
FIG. 2A
FIG. 2
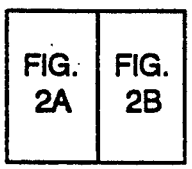

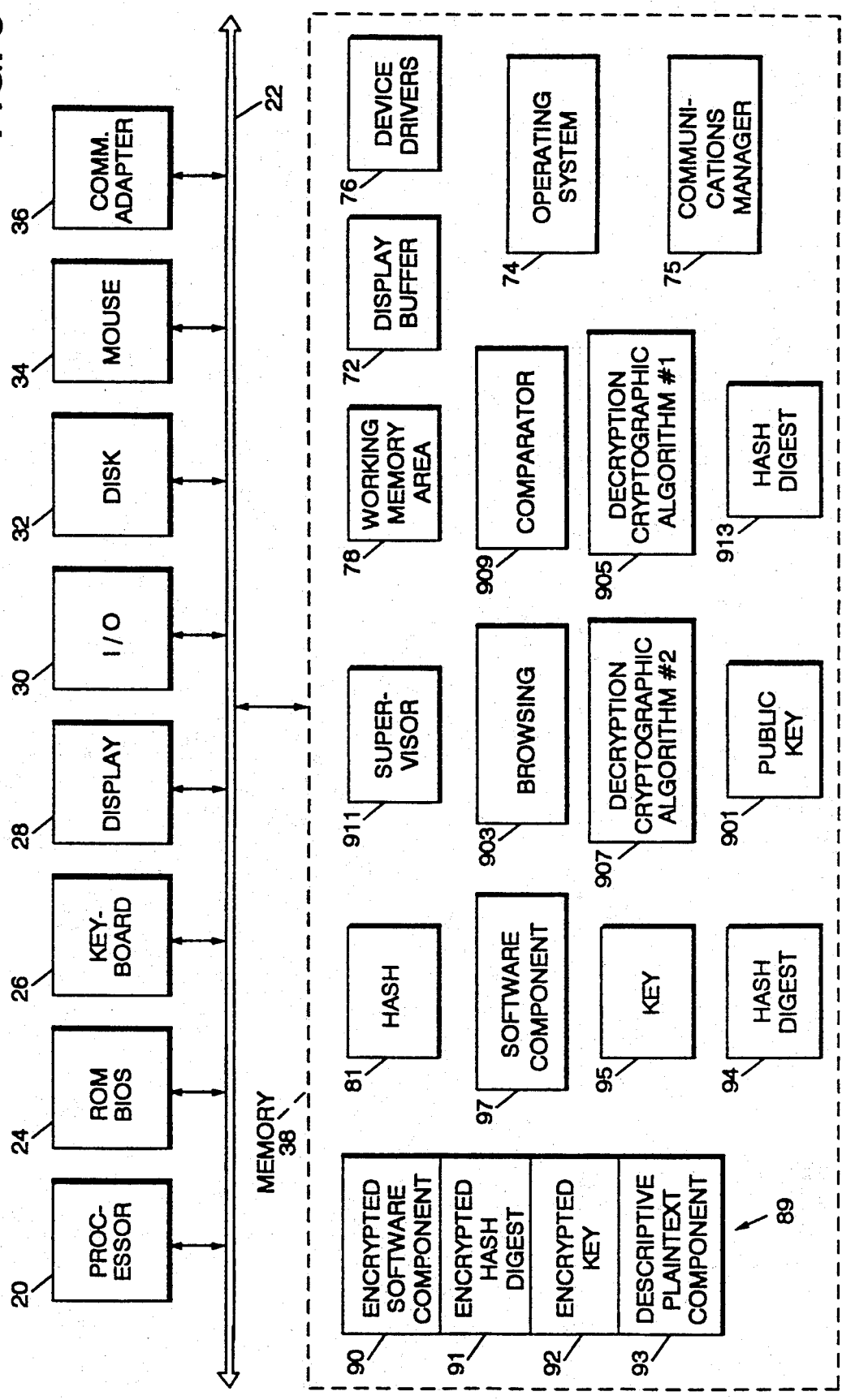

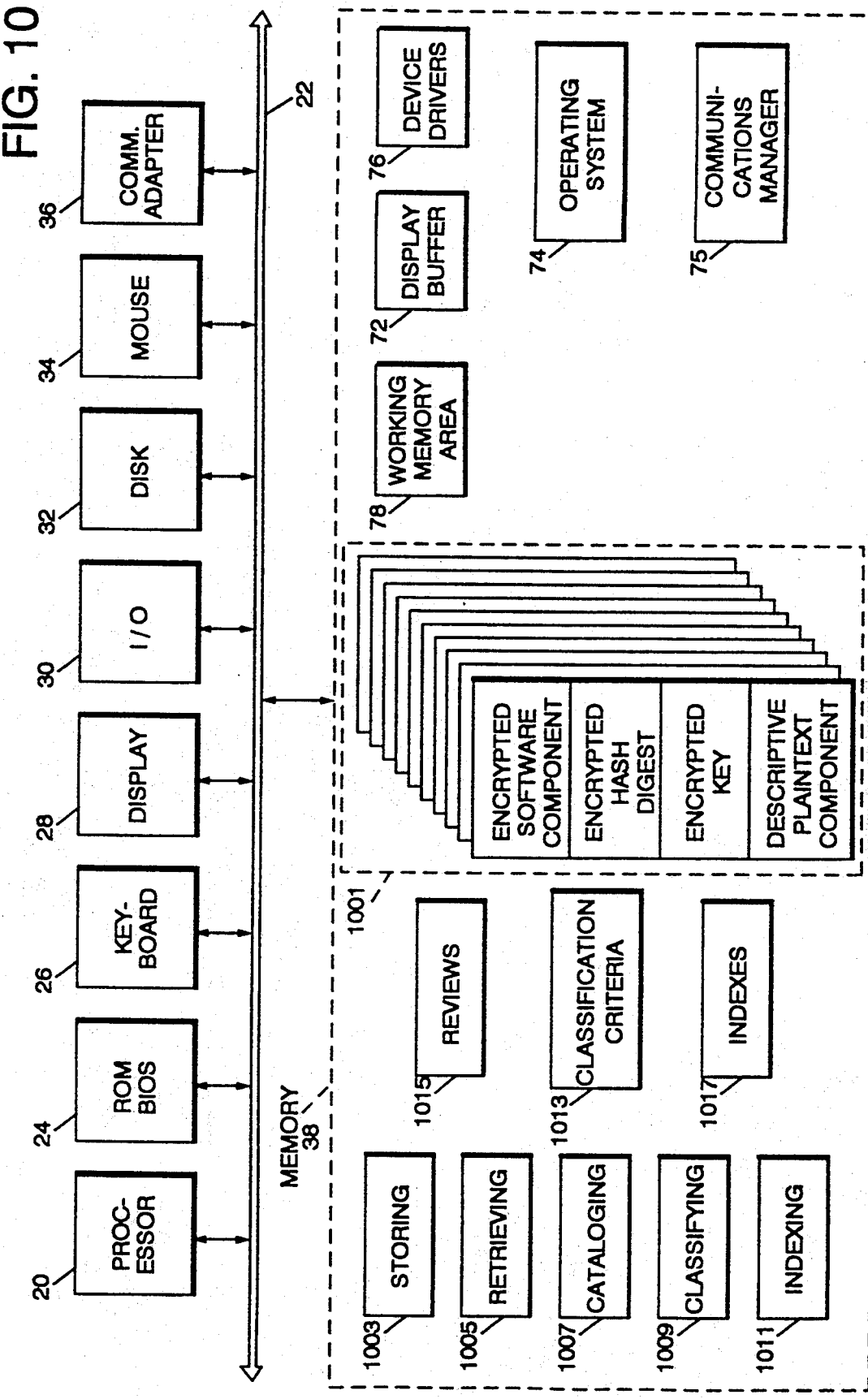

HYBRID ENCRYPTION METHOD AND SYSTEM FOR PROTECTING REUSABLE SOFTWARE COMPONENTS

BACKGROUND OF THE INVENTION

1. Field of the Invention

The present invention relates to a system and method for protecting reusable software components. In particular the present invention encrypts software components in a reusable software component library to protect against unauthorized modification and to assure authenticity of software components when the software components are decrypted by a reuser.

2. Description of the Prior Art

The ability to produce ever larger software systems while improving theft quality and reducing theft development time crucially depends upon a capability to "reuse" previously developed software components in new systems. There is an emerging electronic marketplace that will enable potential reusers to browse libraries of software components, select suitable ones, and obtain them for reuse. Rudiments of such a marketplace already exist in operational software reuse libraries. Such libraries, though, are vulnerable to the unauthorized modification of existing code or to unscrupulous parties who might misrepresent the origin of code which they place into the library.

A reuse library must provide protection against the unauthorized modification of software components in order for the software reuse marketplace to emerge. Without such protection publishers would be reluctant to place their software in a reuse library and reusers would be reluctant to use software components from the reuse library. Without such protection software components are subject to modification for purposes of malice, sabotage, espionage or others. Modifications by an innocent third party can also cause problems due to incompetence, carelessness, a lack of discipline or misunderstanding. The ability of a third party to modify a software component without detection cannot be tolerated in the reuse marketplace.

The authentication problem arises where an unscrupulous party seeks to pass off (or palm off) their software components as that of another publisher thereby preying on the reputation and goodwill of other publishers. This is of particular importance in the reuse marketplace because reusers can often only rely on the reputations and software development processes used by software publishers.

Many agencies today are actively involved in developing and evolving their software development processes. Independent organizations such as the Software Engineering Institute (SEI) evaluate these processes and rate them according to an established set of criteria. Reusers can rely on these evaluations in making their reuse selections.

There are also legal considerations to be considered such as who is representing that they created the software. Under current copyright law the innocent infringer loses against the true owner of the copyrighted work. The reuser needs some assurance that publisher has the right to permit the reuser to make use of the software component. Without such assurances the reuser risks any gains by reuse in a subsequent legal battle.

There is a critical need to provide a reuser with an assurance that the identity of the producer of software component being purchased is the software producer and not some other third party. There is also a critical need to provide the reuser with an assurance that a software component has not been corrupted or modified.

SUMMARY OF THE INVENTION

The present invention is directed to a method and apparatus that satisfies these needs. It is an object of the invention to provide an integrity mechanism that provides an indication that a software component has been modified.

It is an object of the invention to quickly provide an integrity mechanism that provides an indication that a software component has been modified. It is a still a further object to prevent third parties from modifying software components in a reuse library. It is an object of the invention to provide an authentication mechanism that provides reusers with assurance that the software component is the authentic product of its stated publisher. It is yet another object of the invention to prevent third parties from passing off their software components as that of another. It is still another object of the invention to provided for the authenticity of a software component and an indication of whether the software component has been modified.

Accordingly, the present invention provides a system and method for providing a reuser with an indication of whether or not a software component from a reuse library is authentic and whether or not the software component has been modified. The present invention comprises a method for reusing software components that maintains the integrity and authenticity of the software components. The method comprises generating an software component record by encrypting a plaintext representation of a software component into a encrypted software component with a first cryptographic algorithm using first key; hashing the encrypted software component to generate a first hash digest; encrypting the first hash digest and the first key using a second cryptographic algorithm with a second key, wherein said second cryptographic algorithm is of a public key type and said second key is the private key associated with at least one public key, said software component record consisting of the encrypted software component, the encrypted hash digest, and the encrypted first key. The software component record is then stored in a reuse library. The software component can then be retrieved from the reuse library. The plaintext representation of the software component is then generated by obtaining a public key associated with the second key from a public key directory; decrypting the encrypted hash digest and the encrypted first key into the decrypted first key and the decrypted first hash digest using the public key and the second cryptographic algorithm; hashing the encrypted software component to generate a second hash digest; comparing the second hash digest with the decrypted first hash digest, and if not identical indicating that the software component is corrupted, if identical indicating that the software is not corrupted; decrypting the encrypted software component into the plaintext representation using the decrypted first key and the first encryption algorithm.

The present invention comprises a network of computer systems comprising a reuse library, a directory, at least one publisher's workstation and at least one reuser's workstation. The reuse library having a plurality of encrypted software components each software component record having an encrypted software component, an encrypted hash digest, and an encrypted first key; the reuse library also having a storage means for storing encrypted software components and a retrieval means for retrieving encrypted software components. The directory containing a list of publishers and an associated list of public keys. A publisher's workstation coupled to the reuse library, having an first encrypting means for encrypting a plaintext representation of a software component into a encrypted software component with a first cryptographic algorithm using first key; an hashing means for hashing the encrypted software component to generate a first hash digest; a second encrypting means for encrypting the first hash digest and the first key using a second cryptographic algorithm with a second key, wherein said second cryptographic algorithm is of a public key algorithm type and said second key is the publisher's private key associated with a publisher's public key, said software component record consisting of the encrypted software component, the encrypted hash digest, and the encrypted first key; a communications means for sending the software component record to the reuse library for storage by the storage means. A reuser workstation coupled to the reuse library, said reuser workstation having a requesting means for sending a request to the reuse library for a desired encrypted software component, wherein said request causes the retrieval means of the reuse library to retrieve the desired software component and send it to the requesting workstation; a means for obtaining the public key from the directory, said public key associated with the second key of the desired encrypted software component; a first decrypting means for decrypting the encrypted hash digest and the encrypted first key into the decrypted first key and the decrypted first hash digest using the public key and the second cryptographic algorithm; an hashing means for hashing the encrypted software component to generate a second hash digest; a comparing means for comparing the second hash digest with the decrypted first hash digest, and if not identical indicating that the software component is corrupted, if identical indicating that the software is not corrupted; a second decrypting means for decrypting the encrypted software component into the plaintext representation using the decrypted first key and the first encryption algorithm.

BRIEF DESCRIPTION OF THE DRAWINGS

The foregoing and other objects, aspects and advantages of the invention will Inc better understood from the following detailed description with reference to the drawings, in which:

FIG. 9 depicts one embodiment of a computer system for generating a software component from a software component record.

FIG. 10 depicts one embodiment of a computer system for the reuse library.

DETAILED DESCRIPTION OF THE INVENTION

I. DEFINITIONS
II. OVERVIEW
III. CRYPTOGRAPHIC ALGORITHMS & FUNCTIONS
  A. OVERVIEW
  B. PUBLIC KEY and CONVENTIONAL CRYPTOGRAPHIC SYSTEMS
  C. EXAMPLE CRYPTOGRAPHIC ALGORITHMS
    1. Conventional Algorithms
    2. Public Key Algorithms
  D. HASHING
IV. PUBLISHING
  A. DESCRIPTION
  B. EMBODIMENTS
V. REUSING
  A. DESCRIPTION
  B. BROWSING MEANS
  C. EMBODIMENTS
VI. REUSE LIBRARY
  A. DESCRIPTION
  B. EMBODIMENTS
VII. DIRECTORY
VIII. ADVANTAGES AND CLOSING

I. DEFINITIONS

A. "SOFTWARE COMPONENT" is a set of statements or instructions to be used directly or indirectly in a computer in order to bring about a certain result. Thus, a software component can consist of a complete software application, a set of related applications, a module, a single procedure or program, a set of procedures or programs, a software package or a set of software packages. It is preferable for reuse software components to be provided in source code in human readable format.

II. OVERVIEW

Figure 1:
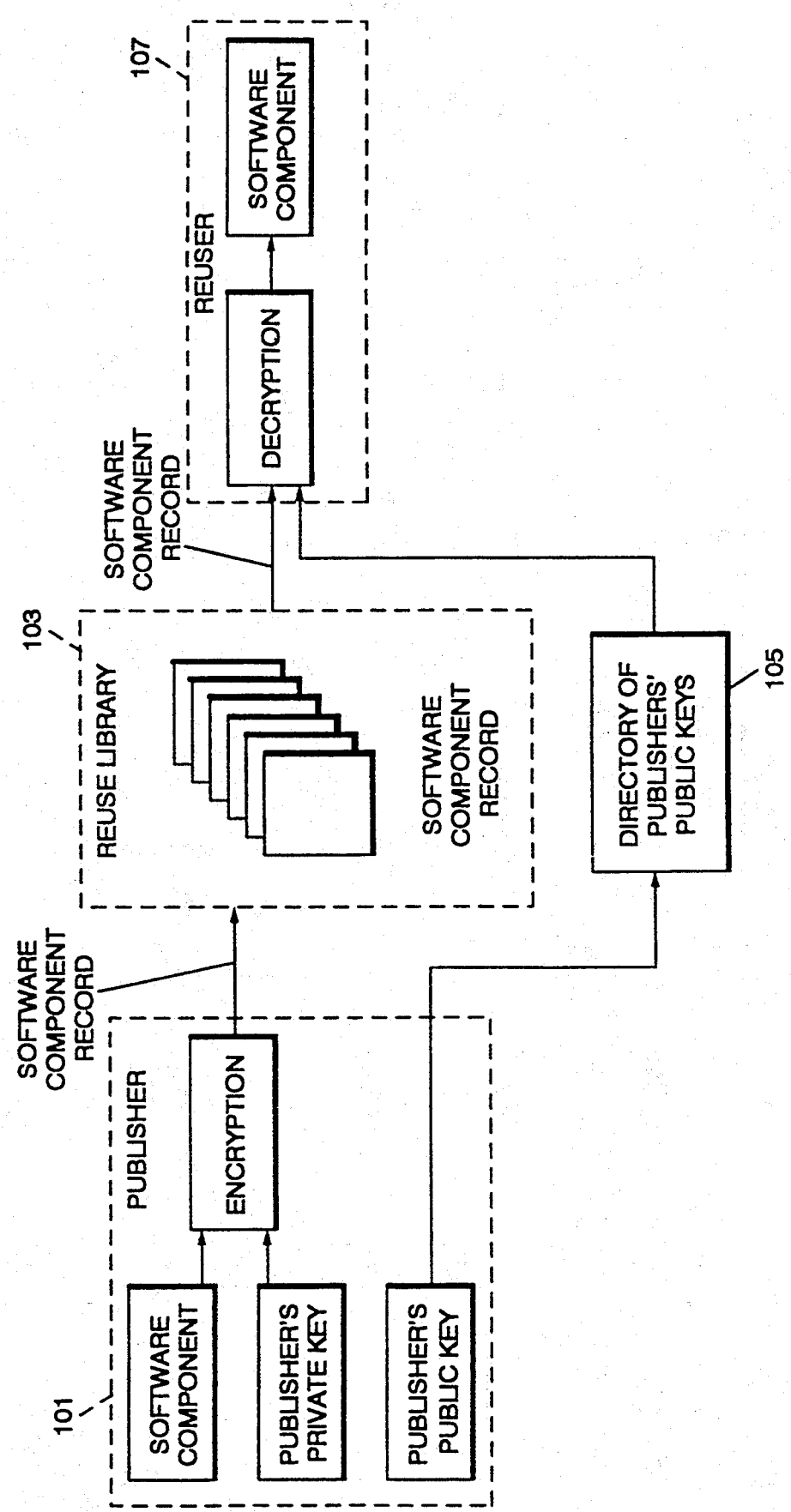
FIG. 1 shows a functional overview of the present invention.

FIG. 1 shows the major elements of the present invention a publisher 101, a reuse library 103, a directory 105 and a reuser 107. The reuse library 103 can contain many software components. The software components are created by software providers. These software providers, called publishers herein, are responsible for the creation of software components. The act of placing the software component into the reuse library is referred herein as publishing the software component. Once placed in the reuse library by a publisher, the software component becomes available for reuse by other entities. These other entities may consist of individuals, corporations, associations, government branches agencies or departments. The reuser 107 must decide whether a software component placed in the reuse library is suitable for an application or software requirement that they may have. The reuser can browse software components in the reuse library while determining whether any software components suit the reuser's particular requirements. By making use of software components in the reuse library the reuser can reduce their software development costs. The act or process whereby a reuser selects a software component for use in an application or software effort is herein referred to as reusing. Reusing includes browsing of software components in the reuse library.

Figure 2B:
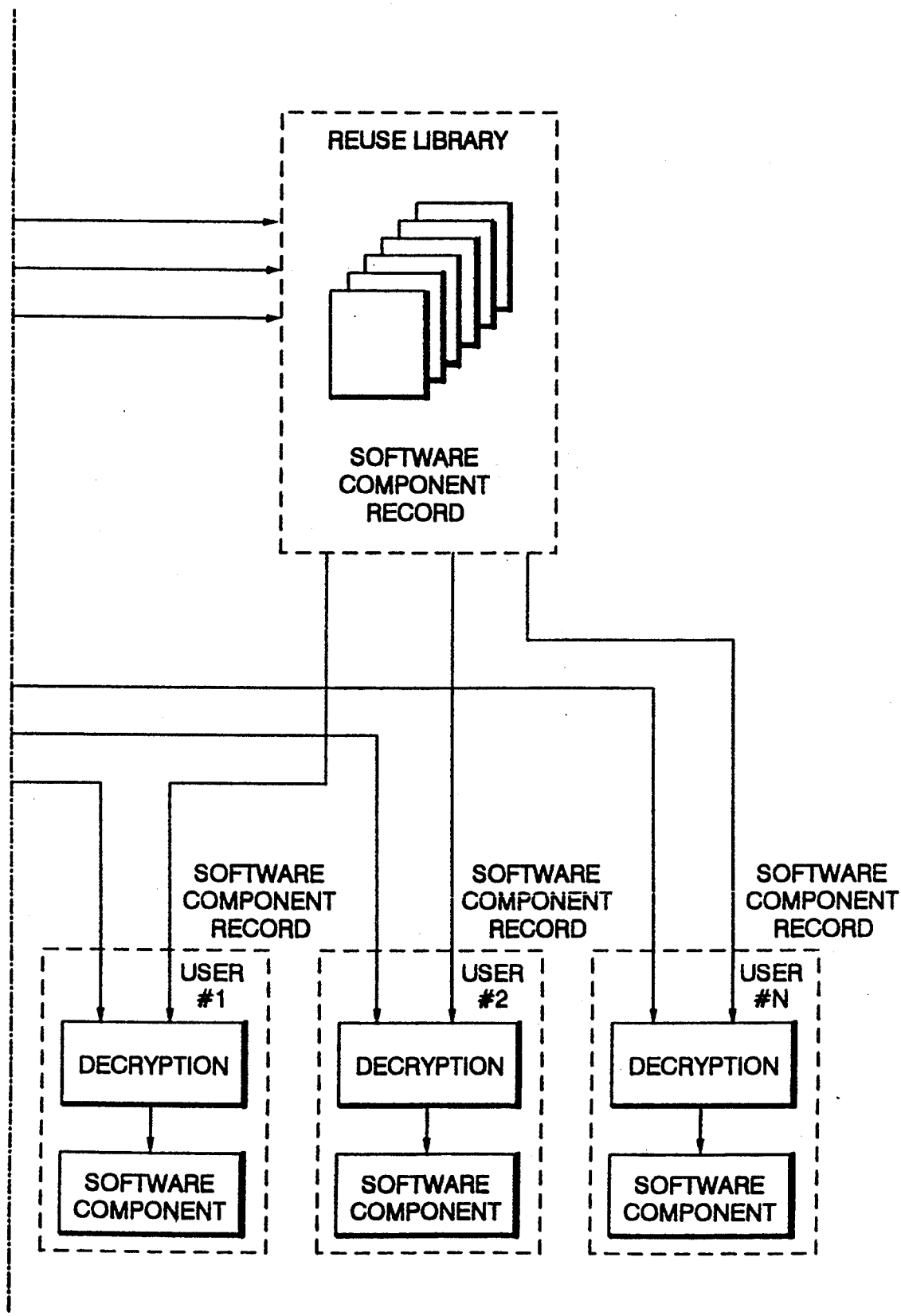
FIG. 2 shows a functional overview of the present invention depicting multiple publishers and multiple reusers.

Although FIG. 1 shows only one publisher 101 and one reuser 107 the present invention contemplates many publishers and many reusers. In fact publishers may also be reusers and reusers may also be publishers. Multiple publishers and multiple reusers are shown in FIG. 2. The reuse library 103 may also consists of multiple libraries where each library is orientated towards particular classes of reusers. For instance, based on language type (e.g., C or Ada) or based on the type of application (e.g., real time systems or embedded systems) or by application or function (e.g., accounting, navigation, air traffic control, word processing, etc.). Thus, a multitude of reuse libraries are contemplated by the present invention. The reuse library may also perform certain classifying or cataloging functions so that a software component is indexed properly or more easily located by a potential user.

When the publisher 101 decides that a particular software component is ready for the reuse library 103 several steps must be taken so that an eventual reuser is assured that it is the particular publisher's software component and not an impostor's and that the software component has not been modified. The software component as developed by the publisher typically consists of a plaintext representation. This is typically an ASCII or EBCDIC encoded representation. An operator can thus view the software component on a display screen or print the software component on a printer. The plaintext representation is the unencrypted format. Before transmitting or sending the software component to the reuse library the software component is encrypted using the hybrid encryption technique of the present invention. Two cryptographic algorithms are used to encrypt the software component a conventional key algorithm and a public key algorithm. The encrypted software component is then sent to the reuse library for storage and eventual retrieval by a reuser. The encrypting or enciphering method assures that any reuser of the software component is provided with notice that the software component has been modified or that the software component is not authentic (i.e., that the publisher associated with the software component in the reuse library is not in fact the actual publisher). The publisher encrypts the software component using the hybrid technique using the publisher's private cryptographic key. Only the publisher knows the private key. This key must be safeguarded by the publisher if they are to assure the integrity of their software components. In order for the encrypted software component to be decrypted the reuser must use the publisher's public key. The public key is associated with the publishers private key, but cannot be used to derive the private key.

In order for the reuser to make of use of an encrypted software component the reuser must decrypt the encrypted software component from its encrypted, into its plaintext representation. The present invention requires that the reuser have the publishers public key in order to obtain the plaintext representation of the software component. The reuser obtains the publishers public key from the directory of publisher's public keys. The public key may be made available in a separate notebook, a traditional book, a separate file server, or as part of the reuse library. The directory 105 may also be provided on a trusted platform connected to the reuser by a trusted path to assure that only authorized reusers are provided with access to the reuse library. With the public key the reuser is able to obtain the plaintext representation of the software component.

III. CRYPTOGRAPHIC ALGORITHMS & FUNCTIONS

A. OVERVIEW

Cryptography is the transformation of intelligible information into apparently unintelligible form in order to conceal the information from unauthorized parties. Cryptography is a known practical method to protect information transmitted electronically through communications network and as will be shown with the present invention can be an economical way to protect stored data. The cryptographic transformation of data is defined by a cryptographic algorithm or procedure under the control of a value called a cryptographic key. See text "Cryptography and Data Security," by Denning, Addison-Wesley Publishing Company (1982).

Cryptographic methods can be used to protect not only the confidentiality of data, but the integrity of data as well. Data confidentiality is the protection of information from unauthorized disclosure. Data integrity is the protection of information from unauthorized modification.

There are two basic elements associated with any cryptographic system. These elements are a set of unchanging rules or steps called a cryptographic algorithm and a set of variable cryptographic keys. The algorithm is composed of encrypting and decrypting procedures which usually are identical or simply consist of the same steps performed in reverse order, but which can be dissimilar. The keys selected by the user consist of a sequence of numbers or characters. An encryption key (Ke) is used encrypt plaintext X into ciphertext Y as shown below $$E_{Ke}(X) = Y$$

and a decryption key (Kd) is used to decryption ciphertext Y into plaintext X as shown below.

$$D_{Kd}[E_{Ke}(X)] = D_{Kd}[Y] = X.$$

B. PUBLIC KEY and CONVENTIONAL CRYPTOGRAPHIC SYSTEMS

There are two basic types of Cryptographic algorithms: conventional and public key (also referred to as symmetric and asymmetric). With a conventional algorithm the encryption and decryption keys may either be easily computed from each other or the keys may be identical (Ke=Kd=K). In a public key algorithm, one key (usually the encryption key) is made public and a different key (usually the decryption key) is kept private. As will be discussed in detail below the present invention utilizes the private key to encrypt and the public key to decrypt. With a public key system it must not be possible to deduce the private key from the public key. When an algorithm is made public, for example with a published encryption standard, cryptographic security completely depends on protecting these cryptographic keys.

To keep information secret, and to achieve privacy, a reversible algorithm must be used. This allows for reversing the encryption process to recover the software component or data item. However, encryption alone is insufficient to assure that information is not altered during storage. This is most evident when encryption with a public key algorithm is used. With a public key system as used with the present invention, any one can decrypt using the public decryption key, unlike public key systems where the public key is the encryption key and the private key is the decryption key and any system user or node can masquerade as any other system user or node.

In contrast to the conventional cryptographic algorithms a public key method uses two different keys to encrypt and decrypt a message. Successful methods are designed so that neither key may be inferred from the other. When used for authentication, the sender encrypts messages using the encryption key which is held in secrecy. The decryption key is made publicly known. Any receiver can decrypt the message using the publicly known key and be confident that the data is not forged or altered because only the presumed sender knows the corresponding encryption key.

In general it is preferable for performance reasons to use conventional algorithms such as DES for bulk data encryption rather than to use a public key algorithm.

The Digital Signature Algorithm (DSA) "hashes" the item to be authenticated so that a smaller "hash digest" is produced. The original item is transmitted in plaintext along with an encrypted version of the hash digest. The receiver authenticates by hashing the received plaintext to regenerate the hash digest, decrypts the transmitted hash digest and compares the two digests for equality.

This method has some weaknesses when applied to software components. First, because the component is available in plaintext, it is tempting for potential reusers to forget about authenticating the component and to simply use the plaintext as is. One could remedy this defect by encrypting the entire component. The problem with this approach is that public key cryptographic schemes are very slow in operation (as compared to private key schemes); they may be impractically slow when applied to objects as large as software components with their related documentation.

The solution to this problem is to use a hybrid encryption scheme of the present invention. With this approach, the software component is encrypted using a private-key method, like DES. The DES key could be generated in an arbitrary fashion for each usage so that, in practical terms, every usage is unique. The key that was used for a software component is included with the encrypted software component. The encrypted software component is hashed to generate a digest. The digest and the DES key are then encrypted using the public key method.

Reusers who wish to look at the software component decrypt the hash digest and the DES key by applying the publicly known decryption key of the software component's publisher. The reuser regenerates the hash digest from the encrypted software component and compare it with the just-decrypted hash digest. The reuser can use the just-decrypted DES key to quickly decrypt the encrypted software component.

C. EXAMPLE CRYPTOGRAPHIC ALGORITHMS

1. Conventional Algorithms

Data Encryption Standard (DES)

The *Data Encryption Standard (DES)* is described in Federal Information Processing Standard Publication (FIPS PUB) 46 and available from the National Technical Information Service, 5285 Port Royal Road, Springfield, Va. 22161. DES hardware is available from Technical Communications Corp.

SkipJack

Skipjack is a symmetric key algorithm viewed as a possible replacement to DES. Capstone is a data security chip that utilizes the skipjack algorithm, secure hash algorithm and the key exchange algorithm. {need a reference}

2. Public Key Algorithms

Public key algorithms are described in a paper by W. Diffie and M. E. Hellman entitled "Privacy and Authentication: An Introduction to Cryptography," Proceedings of the IEEE, Vol. 67, No. 3, March 1979, pp 397–427 hereby incorporated by reference. Examples of public key cryptographic systems are provided in: U.S. Pat. No. 4,218,582 to Hellman et at. "Public Key Cryptographic Apparatus and Method" and U.S. Pat. No. 4,200,770 to Hellman et al. "Cryptographic Apparatus and Method" hereby incorporated by reference.

Digital Signature Standard (DSS)

The National Institute of Standards and Technology has proposed a method for generating control signatures based on a 1985 paper by T. Eigamal entitled "A Public Key Cryptosystem and a Signature Scheme Based on Discrete Logarithms," IEEE Transactions on Information Theory, 31, 1985, pp. 469–472, hereby incorporated by reference. The DSS proposes use of the Digital Signature Algorithm (DSA) to guarantee authenticity and integrity of data transactions.

Rivest-Shamir-Aldeman (RSA)

The RSA public key algorithm is described in U.S. Pat. No. 4,405,829 to Rivest et. at. "Cryptographic Communications System and Method" herein incorporated by reference discloses the RSA public key algorithm.

D. HASHING

A one-way function is a function which is easy to compute in the forward direction, but hard to compute in the reverse direction. That is, if $Y=f(X)$ is a one-way function then given any X it is easy to compute the corresponding Y, taking typically a fraction of a second on a small computer. But given any Y it is extremely difficult to find the corresponding X, ideally taking millions of years on the most powerful computer imaginable. A one-way function can be expansionary (i.e., Y is longer than X), compressive, or neither, depending on the relative sizes of the ciphertext (Y) and key (X). For purposes of this invention, we are primarily concerned with one-way compressive functions, where X is much longer than Y. Typical values herein will be a 100,000 bit length for X and a 100 bit length for Y. A method for generating such an extremely compressive one-way function are well known in the art. Compressive functions are also called "hash functions" and a one-way compressive function is therefore called a one-way hash function.

A method for deriving a one-way function from a conventional cryptographic system is described in section V of Diffie and Hellman's paper, "New Directions in Cryptography", IEEE Transactions on Cryptography, vol. IT-22, November 1976 (see, especially FIG. 3 therein). If X is the plaintext representation of a software component and $E_{Ke}(X)$ represents encrypted version of X using an encryption algorithm E with a cryptographic key Ke. Using a hashing function H, the hash digest $H_d$ is defined as follows:

$$H_d = H(E_{Ke}(X))$$

Computing $H_d$ from X merely involves an encryption $E_{Ke}(X)$ and computing the hashing function (H) given the encrypted software component $E_{Ke}(X)$ and is therefore a simple computation. But computing $E_{Ke}(X)$ or X from $H_d$ involves cryptoanalysis because $X = H^{-1}(H_d)$ and is therefore difficult to compute.

One way hashing functions are well known in the art. Hashing functions suitable for use with the present invention are described in U.S. Pat. No. 4,924,515 titled "Secure Management of Keys Using Extended Control Vectors" to Matyas et. al and U.S. Pat. No. 4,908,861 titled "Data Authentication Using Modification Detection Codes" to Brachtl et. al which are hereby incorporated by reference.

IV. PUBLISHING

A. DESCRIPTION

Figure 3:
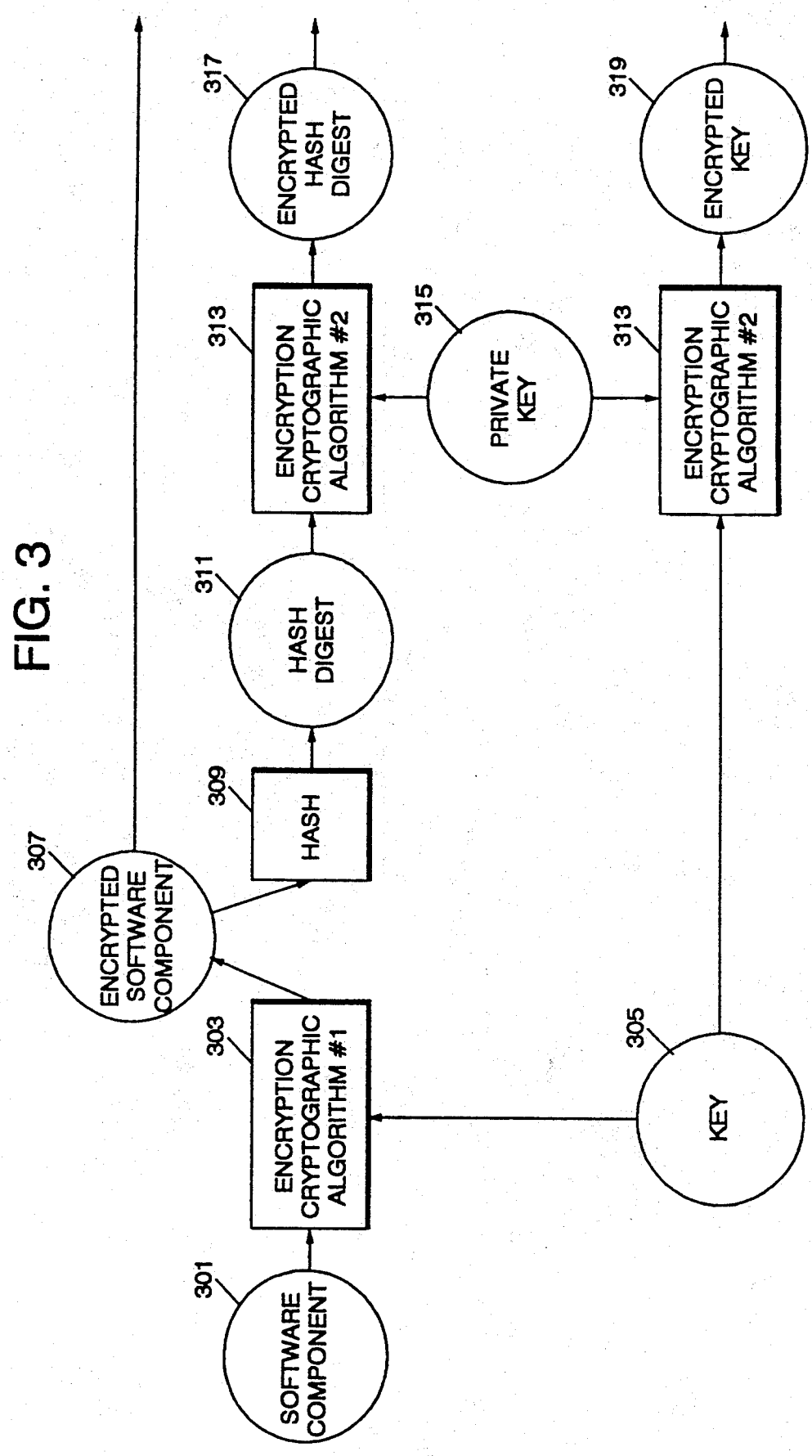
FIG. 3 depicts generating various components of a software component record.
Figure 4:
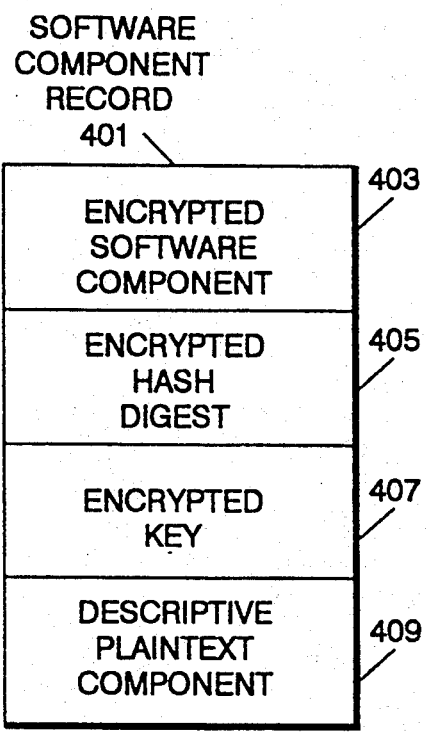
FIG. 4 depicts a representation of a software component record.

When a publisher decides that a software component is ready for publishing several steps must be taken to produce the software component record, as depicted in FIG. 4. Referring now to FIG. 3, which depicts data objects as circles and functions as rectangles, we start with a software component 301 in a plaintext representation. This plaintext representation is typically source code and is typically stored in ASCII or EBCDIC format although, other formats may be used with the present invention (i.e., for instance one of the many word processing formats). The plaintext representation of the software component is transformed by encryption function of cryptographic algorithm #1 303 using cryptographic key 305. Although a public key cryptographic algorithm may be used for cryptographic algorithm #1 303 it is preferable to use a conventional cryptographic algorithm like DES. This is due to performance considerations. Since the software component may be quite large, a faster encryption function is desired so that a reuser is not kept waiting during decryption. Also a conventional cryptographic algorithm makes browsing of the software component by the reuser much faster. Note that if a public key cryptographic algorithm type is used for the cryptographic algorithm #1 303 then the key supplied for cryptographic algorithm #2 313 would be the public key (assuming that the private key is used to encrypt).

The output of applying the encryption function for cryptographic algorithm #1 using the cryptographic key 305 is the encrypted software component 307. The encrypted software component 307 is then input to the hash function 309. The hash function 309 takes the encrypted software component 307 and produces a hash digest 311. Suitable hashing functions were discussed above. The hash digest 311 and the key 305 are then encrypted using a the encryption function of cryptographic algorithm #2 313. Cryptographic algorithm #2 313 must be of a public key type. Both the hash digest 311 and key 305 are encrypted using the encryption function of cryptographic algorithm # 2 with the private key 3 15. The private key must be properly safeguarded by the publisher. No one need know the private key 315 except the publisher. It is the public key associated with the private key, that can not be used to derive the private key, that is placed in the directory for use by reusers. The publisher must make the public key, associated with private key 315 available to potential reusers in order for the reusers to obtain the plaintext representation of the software component.

The hash digest 311 and key 305 are encrypted using the private key 315 and encryption function of cryptographic algorithm #2 313 to produce and encrypted hash digest 317 and the encrypted key 319. Therefore, we have produced the encrypted software component 307, encrypted hash digest 317, and the encrypted key 319. The only data component missing from that shown in FIG. 4 is the descriptive plaintext component. The descriptive plaintext component may be created by the publisher using any word processor or a by filling in a form provided by the reuse library or extracting the information from the plaintext representation of the software component or from design or requirements specifications or any other source. This information may consist of an abstract, a description, indexes, identification of other software component from which the particular software component was derived, identification of other software components required to make use of the software component, testing status, relationship to other software components, publisher identity, intellectual property information. The reuse library may provide this information or a portion of the information as well as additional information to the descriptive plaintext component. The descriptive plaintext component is discussed in detail below in the section discussing the reuse library.

Figure 5:
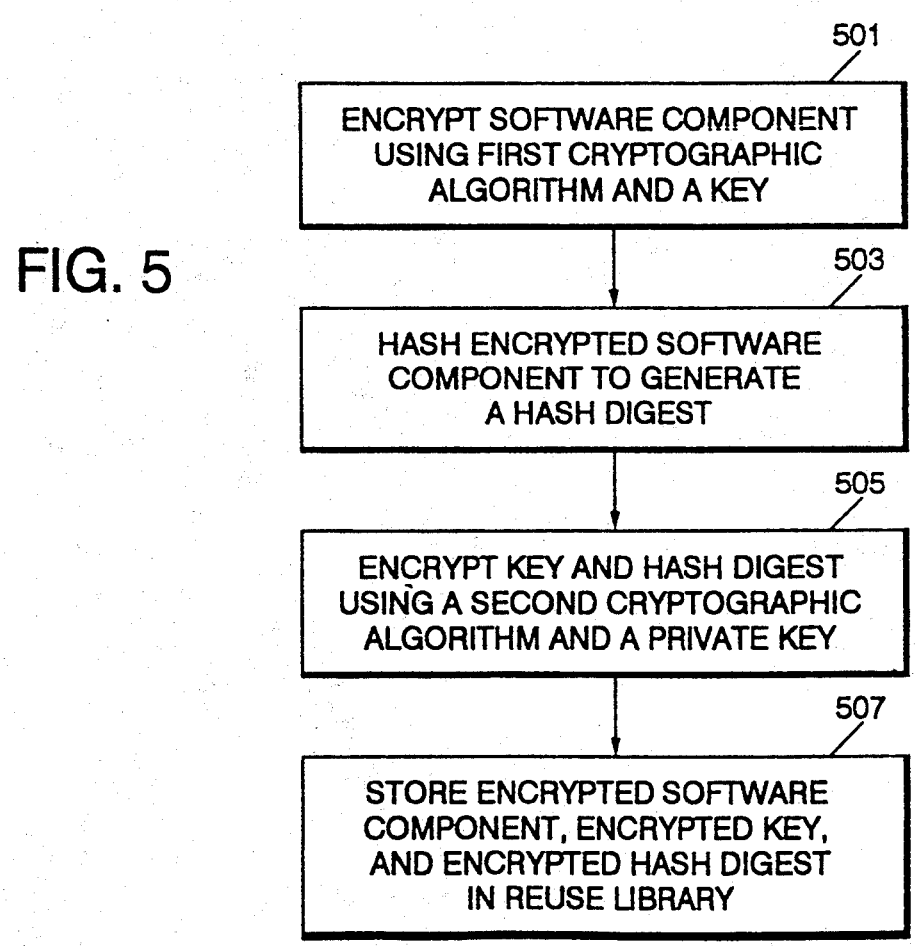
FIG. 5 depicts the steps required to generate various components of a software component record.

FIG. 5 describes a method that can be implemented in hardware or software or any combination of hardware and software. In step 501 the plaintext representation of the software component is encrypted by a first cryptographic algorithm using a key. In step 503 the encrypted software component produced in step 501, is hashed to generate a hash digest. The hash digest from step 503 and the key used in step 501 are then encrypted using a second cryptographic algorithm in step 505. The second cryptographic algorithm being of a public key type, using the private key for encryption from the associated private and public keys. The encrypted software component of step 501, the encrypted hash digest of step 505 and the encrypted key of step 505 are then sent to the reuse library along with descriptive plaintext component for storage and other processing performed by the reuse library.

B. EMBODIMENTS

It should be noted that the functions described in FIG. 3 and steps of FIG. 5 may be carried out in either hardware or software or a combination of both. As mentioned in the cryptographic sections above many different cryptographic systems and functions are commercially available in hardware and software embodiments. Chip sets, boards, boxes, cards and software arc available for performing the encrypting and hashing functions required for publishing a software component. The preferred embodiment of the present invention is to have these functions performed using software so that interfacing with the reuse library can be performed from any computer system equipped with the software.

Figure 8:
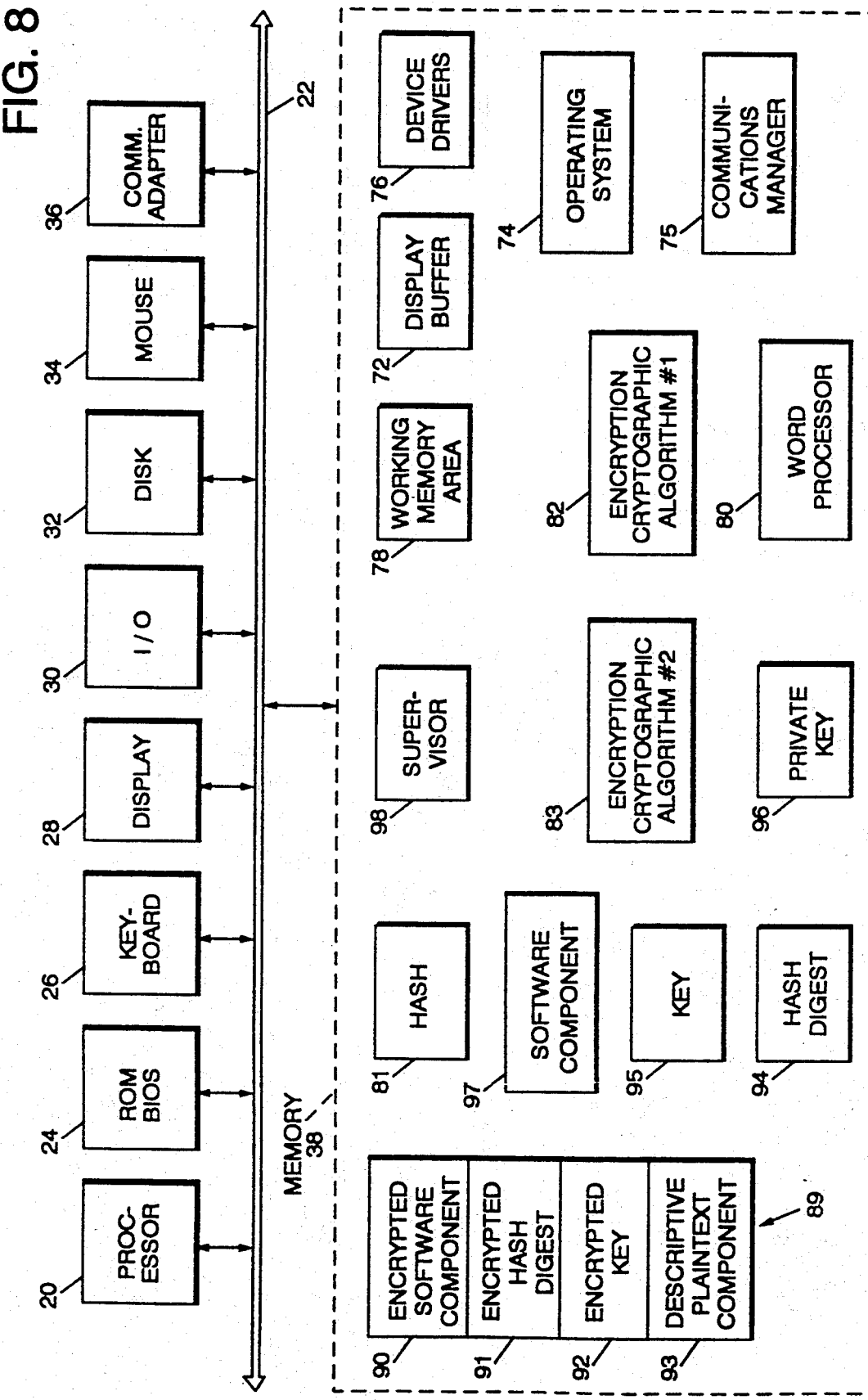
FIG. 8 depicts one embodiment of a computer system for generating a software component record.

The preferred embodiment of the present invention comprises one or more software systems. In this context, software system is a collection of one or more executable software programs, and one or more storage areas, for example, RAM or disk. In general terms, a software system should be understood to comprise a fully functional software embodiment of a function, which can be added to an existing computer system to provide new function to that computer system. One embodiment of the present invention is shown in FIG. 8. The embodiment of the publishing workstation depicted in FIG. 8 is a collection of functions and data items. These functions and data items were explained in detail above. As shown in FIG. 8 the preferred embodiment of this invention comprises a set of computer programs for the generation of an encrypted software component 90, encrypted hash digest 91, encrypted key 92, from a software component 97 along with the descriptive plaintext component 93. FIG. 8 includes a processor 20 connected by means of a system bus 22 to a read only memory (ROM) 24 and memory 38. Also included in the computer system in FIG. 8 are a display 28 by which the computer presents information to the user, and a plurality of input devices including a keyboard 26, mouse 34 and other devices that may be attached via input/output port 30. Other input devices such as other pointing devices or a voice sensors or image sensors may also be attached. Other pointing devices include tablets, numeric keypads, touch screen, touch screen overlays, track balls, joy sticks, light pens, thumb wheels etc. The I/O 30 can be connected to communications lines, reuse library, directory, disk storage, input devices, output devices or other I/O equipment. The computer system shown in FIG. 8 may also be connected to the directory and reuse library via the communications adaptor 36. Communications between the publisher and other systems is provided via the communications manager 75. Communications manager 75 provides for the sending and receiving of data and requests. The memory 38 includes a display buffer 72 that contains pixel intensity values or character values for presentation on the display. The display 28 periodically reads the values from the display buffer 72 displaying these values or characters onto a display screen.

As shown in FIG. 8, the memory 38 includes a word processor 80, a hash function 81, an encryption function for cryptographic algorithm #1 82, a encryption function for cryptographic algorithm #2 83, hash digest 94, key 95 and private key 96.

The hash 81, encryption 82, encryption 83 and the word processor functions cause the software component record 89 with its four components: encrypted software component 90, encrypted hash digest 91, encrypted key 92 and the descriptive plaintext component 93 to be generated as described above. The supervisor 98 can coordinate the data flow between these functions and make sure the output generated is sent to the reuse library. Alternatively, each function can perform the required data flow as required. Also shown in the memory 38 is an operating system 74. Other elements shown in memory 38 include drivers 76 which interpret the electrical signals generated by devices such as the keyboard and mouse. A working memory area 78 is also shown in memory 38. The working memory area 78 can be utilized by any of the elements shown in memory 38. The working memory area can be utilized by any of functions it may also be used to store the various data items. The working memory area 78 may be partitioned amongst the elements and within an element. The working memory area 78 may be utilized for communication, buffering, temporary storage, or storage of data while a program is running.

V. REUSING

A. DESCRIPTION

Figure 6:
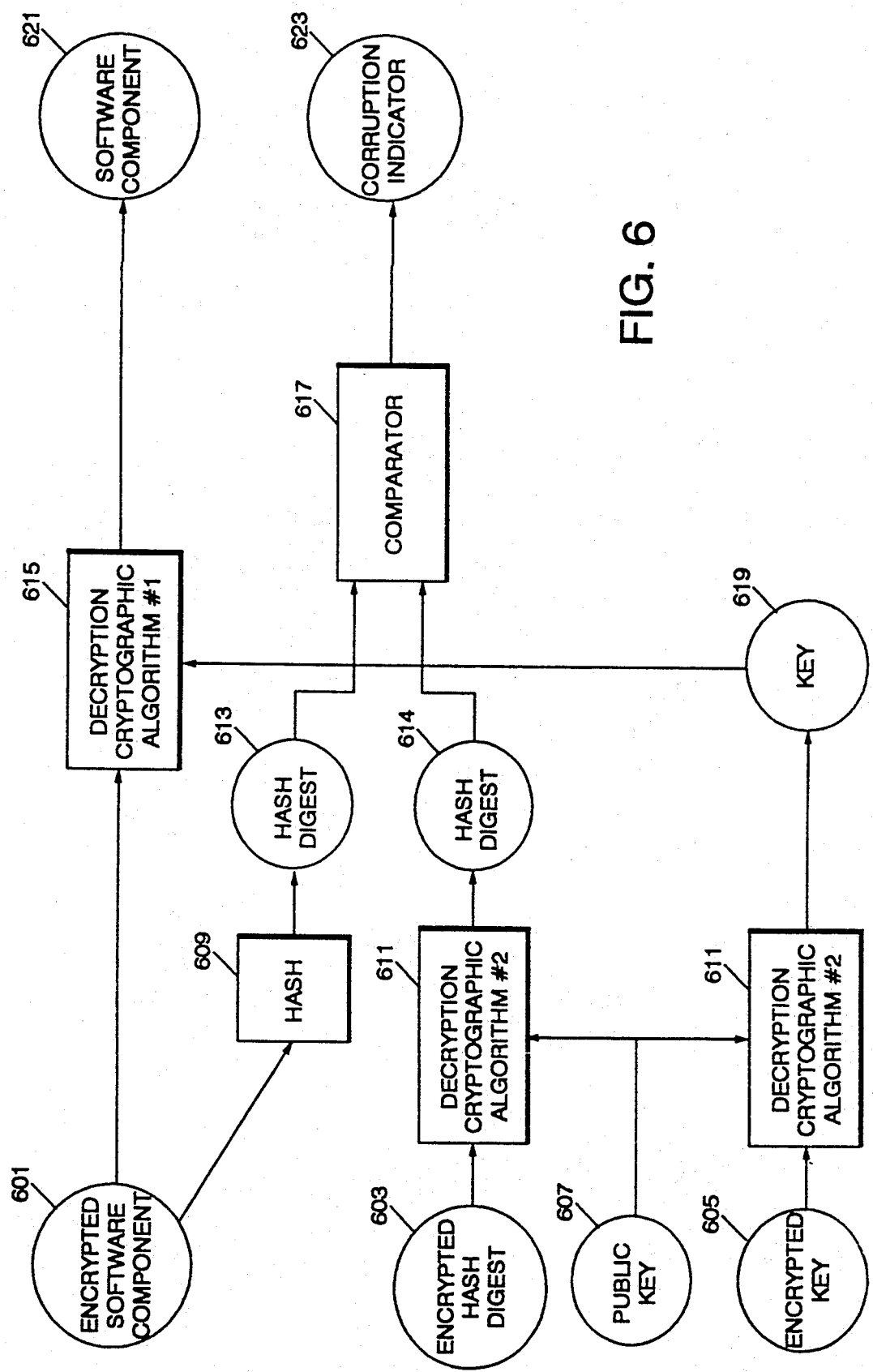
FIG. 6 depicts generation of the plaintext representation of a software component from a software component record.

The process used by the reuser is very similar to that used by the publisher except the steps are reversed. Referring now to FIG. 6 which depicts data objects as circles and functions as rectangles. FIG. 6 provides a functional overview of what a reuser needs to do in order to reuse a software component stored in the reuse library. Although not shown on FIG. 6 the reuser first retrieves or causes the reuse library to retrieve a software component record. The components of a software component record are depicted in FIG. 4. FIG. 6 shows the encrypted software component 601, the encrypted hash digest 603, and the encrypted key 605 of the retrieved software component record. Note that the reuser also requires public key 607. Public key 607 is obtained from the directory of publisher's public keys. The directory is discussed in detail below. The public key may be requested from the directory from information contained in the descriptive plaintext component (not shown) of the retrieved software component record. Thus the reuser knows which publisher's public key to request. The public key 607 is used with the decryption function of cryptographic algorithm #2 611. Using the public key 607, the decryption function processes the encrypted hash digest 603 and the encrypted key 605 to yield the hash digest 614 and the key 619, respectively.

The encrypted software component 601 is hashed by hash function 609 to yield hash digest 613. The hash function 609 utilized in the reuse function must be the same hash function that was utilized by the publisher. The hash digest 613 generated by the hash function 609 is then compared with the hash digest 614 decrypted from decryption function 611. This comparison is made by the comparator function 617. If the hash digest 613 and hash digest 614 are identical then no modification of the software component has taken place and no corruption will be indicated by the corruption indicator 623. If however, the hash digests are not identical then the software component has been corrupted and a corruption indication must be given. The indicator could be any visual or audible signal. A message flashing on the screen accompanied by beeping is usually sufficient to inform the reuser that the software component has been corrupted.

Figure 7:
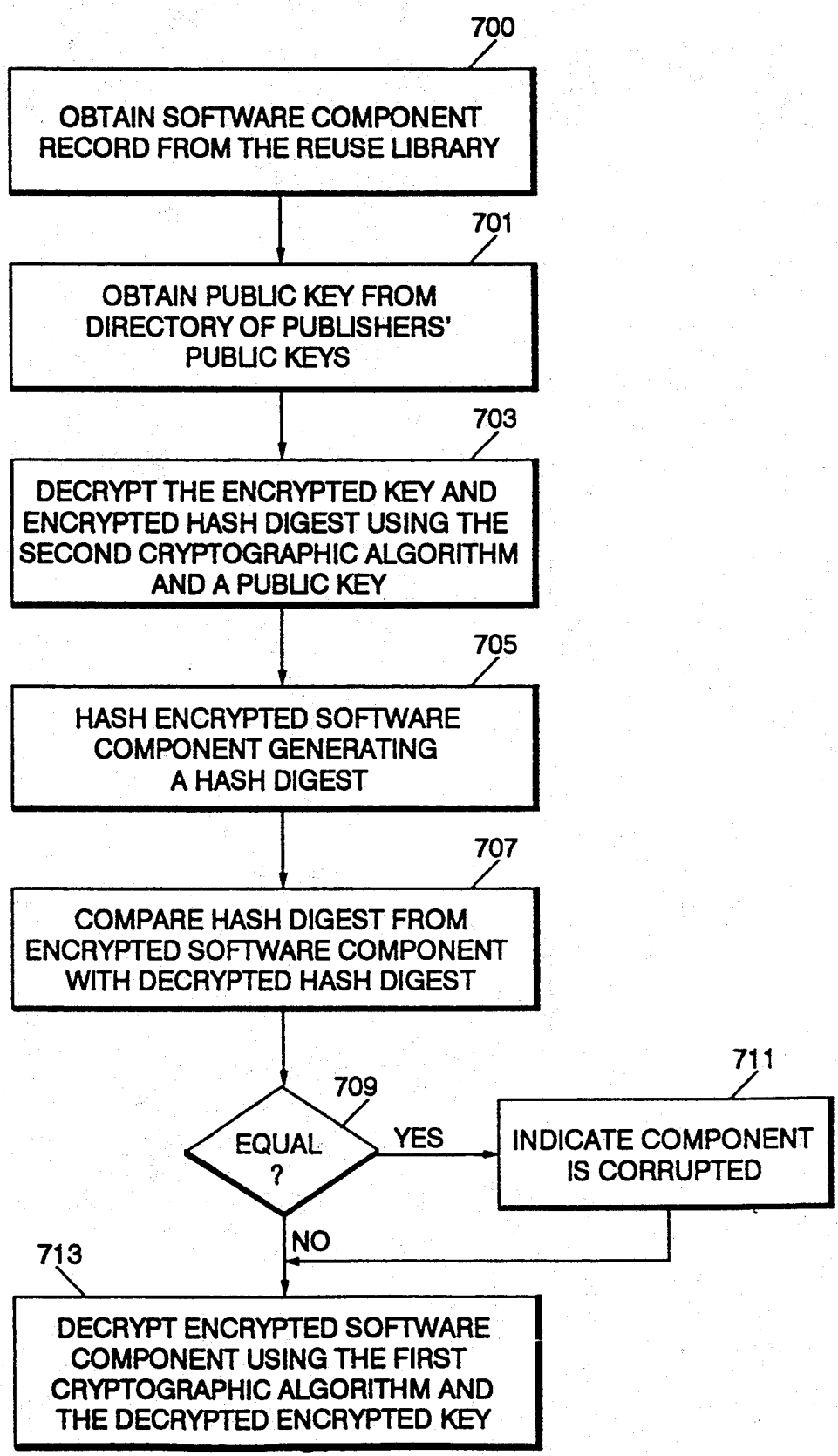
FIG. 7 depicts the steps required to generate a plaintext representation of a software component from a software component record.

If no corruption indicator has been generated the encrypted software component is decrypted using the decryption function of algorithm #1 615 and the key 619 obtained from decryption function 611. Note even if a corruption indication was generated the encrypted software component might be decrypted but presumably the reuser would not want to use the corrupted component for fear of the effect of the corruption (e.g., possible viruses, bugs, etc.). The result of decryption function 615 using the encrypted software component 601 as input and the key 619 is the software component 621. The software component 621 can now be viewed by the reuser on the display, edited, modified or incorporated into a larger systems as the reuser desires. The reuser may also browse the software component 621 using the browsing means described below. If the comparator function 617 detects corruption it could tag (or place text inside) the plaintext representation of the software component 621 with a warning label that indicates to anyone browsing the software component that the component has been modified and that reuse is not recommended. FIG. 7 describes a method that can be implemented in hardware or software or any combination of hardware and software. In step 700 one or more software component records are retrieved or caused to be retrieved from the reuse library. In step 701 the public key associated with the publisher of the retrieved software component is obtained from a directory of publisher's public keys. In step 703 the encrypted hash digest and the encrypted key are decrypted using the second cryptographic algorithm and the public key obtained from step 701. In step 705 the encrypted software component is hashed into a hash digest. In step 707 the hash digest obtained from step 705 and the hash digest from step 703 are compared. If equal then an indication that the software component was not modified or corrupted may be provided (not shown). If not equal then in step 711 an indication is provided to the reuser that the software component has been corrupted or modified in some fashion. In step 713 the encrypted software component is decrypted using the first cryptographic algorithm and the key decrypted in step 703 to provide the plaintext representation of the software component. Other steps may be added for instance to support browsing as discussed below.

B. BROWSING MEANS

After retrieving a software component record from the reuse library the reuser may easily browse information contained in the descriptive plaintext component of the retrieved software component record. The browsing displays or prints information in human readable format. The browsing means can write directly to the display buffer or via operating system calls. The descriptive plaintext component of the software record contains information designed to enable the reuser to quickly determine whether a particular software component may be of value to the reuser. The reuser may also browse the plaintext representation of the software component. This requires that the encrypted software component of the software component record by decrypted, as described above. Because the present invention uses a symmetric cryptographic algorithm for encryption and decryption of the software component, decryption can be performed relatively fast. In fact, while the reuser is browsing the plaintext portion the decryption can be taking place in the background. Thus, the reuser is presented with information contained in the plaintext portion and then the plaintext representation of the software component in a seamless fashion so that decryption is transparent to the reuser. This requires an operating system that supports background processing or multi-processing or multi-tasking. If corruption of the software component is detected then the reuser could be informed as indicated above.

C. EMBODIMENT

It should be noted that the functions described in FIG. 6 and steps of FIG. 7 may be carried out in either hardware or software or a combination of both. As mentioned in the cryptographic sections above many different cryptographic systems and functions are commercially available in hardware and software embodiments. Chip sets, boards, boxes, cards and software are available for performing the decrypting and hashing functions required for reusing a software component or obtaining a plaintext representation of one. The preferred embodiment of the present invention is to have these functions performed using software so that interfacing with the reuse library can be performed from any computer system equipped with the software.

One embodiment of the present invention is shown in FIG. 9. The embodiment of the publishing workstation depicted in FIG. 9 is a collection of functions and data items. These functions and data items were explained in detail above. The preferred embodiment of the present invention comprises one or more software systems. In this context, software system is a collection of one or more executable software programs, and one or more storage areas, for example, RAM or disk. In general terms, a software system should be understood to comprise a fully functional software embodiment of a function, which can be added to an existing computer system to provide new function to that computer system. As shown in FIG. 9 the preferred embodiment of this invention comprises a set of computer programs for the generation of plaintext representation of the software component 97. The computer system of FIG. 9 includes a processor 20 connected by means of a system bus 22 to a read only memory (ROM) 24 and memory 38. Also included in the computer system in FIG. 9 are a display 28 by which the computer presents information to the reuser, and a plurality of input devices including a keyboard 26, mouse 34 and other devices that may be attached via input/output port 30. Other input devices such as other pointing devices or a voice sensors or image sensors may also be attached. Other pointing devices include tablets, numeric keypads, touch screen, touch screen overlays, track balls, joy sticks, fight pens, thumb wheels etc. The I/O 30 can be connected to communications lines, reuse library, directory, disk storage, input devices, output devices or other I/O equipment. The computer system shown in FIG. 9 may also be connected to the directory and reuse library via the communications adaptor 36. Communications between the reuser and other systems is provided via the communications manager 75. Communications manager 75 provides the for sending and receiving of data and requests. The memory 38 includes a display buffer 72 that contains pixel intensity values or character values for presentation on the display. The display 28 periodically reads the values from the display buffer 72 displaying these values or characters onto a display screen.

A software component record 89 obtained from the reuse library is shown in memory 38 along with its four components: the encrypted software 90, the encrypted hash digest 91, the encrypted key 92, and the descriptive plaintext component 93. A public key 901 is also shown in memory 38. The public key 901 may have been obtained via a network, via communications adapter 36 or input by the reuser using any of the input means specified above.

As shown in FIG. 9, the memory 38 includes a browsing means 903, a hash function 81, an decryption function for cryptographic algorithm #1 905, a decryption function for cryptographic algorithm #2 907, and a comparator function 909. These functions enable the computer system to obtain the plaintext representation of the software component 97 with an indication of whether or not the software component 97 has been corrupted as described above. The supervisor 911 can coordinate the data flow between these functions and make obtain the software component from the reuse library. The supervisor may after receiving the software component record 89 cause the browsing means 903 to immediately display information contained in the descriptive plaintext component 93 allowing the reuser to page or search through the information so provided. While permitting the reuser to browse, the encrypted software component 90 can be decrypted. As an alternative to the supervisor 911, each function can perform the required data flow as required.

Also shown in the memory 38 is an operating system 74. Other elements shown in memory 38 include drivers 76 which interpret the electrical signals generated by devices such as the keyboard and mouse. A working memory area 78 is also shown in memory 38. The working memory area 78 can be utilized by any of the elements shown in memory 38. The working memory area can be utilized by any of functions it may also be used to store the various data items. The working memory area 78 may be partitioned amongst the elements and within an element. The working memory area 78 may be utilized for communication, buffering, temporary storage, or storage of data while a program is running.

It should be noted that the reuser workstation and the publisher workstations embodiments can easily be provided in a single computer system that allows an operator to be a reuser and a publisher. This combined workstation may also contain an electronic directory.

VI. REUSE LIBRARY

A. DESCRIPTION

The reuse library is where the publishers send their software component record for access by the reusers. The reuse library can be electronically networked to the publishers or the publishers may simply send the encrypted software component through the mail on diskettes, tapes or other storage media. The reuse library must make the software component record available for browsing and selection by the reusers. Thus, the reuse library must provide storage and retrieval functions for the software component record. Each software component record received by the reuse library must be registered so that the publisher and software component record can be uniquely identified. This usually entails assigning the software component record a unique identifier.

In addition to the reuse library's storage and retrieval of software component records the reuse library may provide for other services as well. These include cataloguing so that software component records referencing other software component records can be easily located. Indexing and classifying the software components are other functions that the reuse library may provide to assist reuser's in more quickly and efficiently locating relevant software components. The reuse library may maintain its own classification data for classifying the software component. The reuse library may also require that the publisher fill out a requested form so that the classification may be more easily carried out. The classification criteria can consists of any criteria useful for discriminating among classes of reusers. Examples of classification criteria are domain or application oriented criteria. The reuse library may reclassify software components as the criteria evolve over time.

In order for the reuse library to perform these other functions, the publishers may be required to furnish certain plaintext information in the descriptive plaintext component of the software component record. The descriptive plaintext component thus contains information that is not encrypted. The information contained in the descriptive plaintext component need not be human readable but can be easily convened to human readable format. The information contained in the descriptive plaintext component may consist of an abstract, a description, indexes, identification of other software component from which the particular software component was derived, identification of other software components required to make use of the software component, testing status, relationship to other software components, publisher identity, intellectual property information. The abstract and/or description would among other things decide the context for which the software component was developed. Intellectual property information may contain licensing and/or derivation information and/or ownership information and/or a certificate of originality that certifies that the publisher created the work. Other software components referenced by the current software component may be identified by their unique identifier or some other suitable description. This information is essential for the reuse library to perform indexing, cataloguing and classification steps and to provide reusers with complete information on a particular software component in order to make a fully informed selection decision.

The reuse library may also add plaintext or a reference to plaintext that are reviews of the software components. The descriptive plaintext component could contain references to these reviews or actual contain the reviews themselves. Reusers may provide reviews concerning their experiences with using or adapting the software component for their own purposes. The reviews may also be created by independent reviewers as the market place for reusable components grows. In summary the descriptive plaintext component may contain information provided from any source. The descriptive plaintext component may be assembled by the reuse library or the publisher or both.

FIG. 4 depicts the logical view of a record for one software component 401 that is provided to the reuse library. The reuse library in registering the software component record would assign the software component record a unique identifier (not shown) and ! hen perform the necessary functions to store the software component record. The software component record 401 consists of four components: the encrypted software component 403, the encrypted hash digest 405, the encrypted key 407 and the descriptive plaintext component 409. Note the descriptive plaintext component is not the plaintext representation of the software component. As was stated above the descriptive plaintext component 409 may consist of any or all of the following data: abstract, a description, indexes, identification of other software component from which the particular software component was derived, identification of other software components required to make use of the software component, testing status, relationship to other software components, publisher identity, intellectual property information. Other information may also be included in the descriptive plaintext component as required or needed.

It should be noted that the software component record 401 as shown in FIG. 4 is a logical view of the software component record. The software component record 401 may be physically stored in a variety of manners. Thus, the software components may be stored as a flat file or in database table or set of database tables or as objects or sets of objects in an object oriented database. A repository may also be used for storing the information contained in the software component record. (See IBM System Journal Repository Manager Technology, Vol. 29, No. 2, 1990 pp 209–227, by Sagawa hereby incorporated by reference). It should be noted that any method of storing and retrieving the information contained in the software component record will work with the present invention. However, database or repository embodiments are preferred because they permit the reusers to more easily search and locate a desired software component and makes the reuse library easier to maintain. This searching/browsing may entail decryption of the encrypted software component or may use the plaintext description and references as described above.

The reuse library may be located on any computer system with suitable storage capability. A file server or database server machine where access is provided to publishers and reusers via a client/server architecture is a preferred embodiment. The publishers and reusers may be connected by phone lines, LAN, WAN, MAN, wireless, cellular telephone or any other communications means.

As was mentioned above the present invention contemplates working with multiple libraries. The libraries may specialize in particular problem domains, particular languages, any other criteria or combinations of the above.

B. EMBODIMENTS

One embodiment for the reuse library of the present invention is shown in FIG. 9. The embodiment of the reuse library as depicted in FIG. 9 is a collection of functions and data items. These functions data items were explained in detail above.

The preferred embodiment of the present invention comprises one or more software systems. In this context, software system is a collection of one or more executable software programs, and one or more storage areas, for example, RAM or disk. In general terms, a software system should be understood to comprise a fully functional software embodiment of a function, which can be added to an existing computer system to provide new function to that computer system. As shown in FIG. 10 the preferred embodiment of this invention comprises a set of computer programs for the storage and retrieval of software component records.

The computer system of FIG. 10 includes a processor 20 connected by means of a system bus 22 to a read only memory (ROM) 24 and memory 38. Also included in the computer system in FIG. 9 are a display 28 by which the computer presents information to the operator of the reuse library and a plurality of input devices including a keyboard 26, mouse 34 and other devices that may be attached via input/output port 30. The I/O 30 can be connected to communications lines, publisher's workstations, reuser's workstations, other reuse libraries, directory, disk storage, input devices, output devices or other I/O equipment. The computer system shown in FIG. 10 may also be connected to the publisher's workstations and the reuser's workstations via the communications adaptor 36. Communications between the reuse library and other systems is provided via the communications manager 75. Communications manager 75 provides the for sending and receiving of data and requests. The memory 38 includes a display buffer 72. The display 28 periodically reads the values from the display buffer 72 displaying these values or characters onto a display screen.

A plurality of software component records 1001 are shown in memory 38 each having four components: the encrypted software, the encrypted hash digest, the encrypted key, and the descriptive plaintext component. The software components may be stored in a repository, a relational database, a flatfile, object oriented data base or any other means. The retrieval means 1003 and the storage means 1005 would then interface with the storage subsystem for the storage and retrieval of software component records. Also shown in memory are cataloging means 1007, classifying means 1009, and indexing means 1011. Also shown are the classifying criteria 1013, software component reviews 1015 and indexes 1017. The retrieval means 1005 may also contain a search capability that permits reusers connected to the reuse library to search through software component records 1001 uses a search criteria, key words, classification criteria, etc.. This search capability could use information contained in the descriptive plaintext component of the software component records.

Also shown in the memory 38 is an operating system 74. Other elements shown in memory 38 include drivers 76 which interpret the electrical signals generated by devices such as the keyboard and mouse. A working memory area 78 is also shown in memory 38. The working memory area 78 can be utilized by any of the elements shown in memory 38. The working memory area can be utilized by any of functions it may also be used to store the various data items. The working memory area 78 may be partitioned amongst the elements and within an element. The working memory area 78 may be utilized for communication, buffering, temporary storage, or storage of data while a program is running.

It should be noted that the reuser workstation and the publisher workstations and reuse library embodiments can easily be provided in a single computer system that allows an operator to be a reuser and a publisher or a librarian. This combined workstation may also contain an electronic directory.

VII. DIRECTORY

The directory of publisher's public keys 105 (FIG 1 & FIG. 2) is basically a list or table. One column in the table contains the publisher and the other column contains the publisher's public key. The publisher's public key is required by the reuser in order to obtain the plaintext representation of any software component the publisher places in the reuse library. A publisher may have more than one public key (this implies that the publisher has more than one private keys). Publishers require write access to the directory or the ability to place their public keys in the reuse library.

The reuser desiring to obtain or browse a software component must obtain the publisher public key. The directory may be contained on the same computer system as the reuse library or another computer system or the reuser's computer system or no system at all. Thus the public keys may be contained in a notebook or print out. In this case the public key would be looked up in the book for input to the decryption hardware or software. Reusers require read access to the directory.

If the directory is stored on a computer system the reuser would obtain the public key and use it to decrypt the desired software component as described above. The reuser may obtain the public key by requesting the key associated with the publisher described in the plaintext portion of the software component record or via the unique identifier or a table provided by the reuse library or some other means.

The directory may be placed on any computer system. A file server or database server where access is provided to publishers and reusers via a client/server architecture is a preferred embodiment. The publishers and reusers may be connected by phone lines, LAN, WAN, MAN, wireless, cellular network or other communications means.

The directory may also be placed in a trusted system with access to the directory provided via a trusted path. Using a trusted system and a trusted path provides additional security in that only authorized individuals would have access to the public keys. Since the public keys are added to the directory by a trusted path and are obtained by only those parties granted access to the trusted system containing the directory would be able to access the directory and the public keys. A trusted file server can be utilized to provide an additional security mechanism. The trusted file server essential keeps the publisher's public keys semi-private in that only those individuals who are provided access to the trusted system can obtain access to the public keys.

The present invention may also be utilized with a certification management system. A certification management system can provide for the directory required by the present invention. A certification management system would handle public keys for other purposes and may also provided a means for certifying electronic signatures as well. The certification management system might be part of a greater encryption infrastructure. The certification management system may allow others to electronicly look up each other's public keys. The certification management system could also handle key exchanges and digital signatures. The reusers and publishers might be connected to such a system by Interact or other network.

VIII. ADVANTAGES AND CLOSING

This present invention provides several advantages. The first advantage is that large software components are encrypted and decrypted using a fast private key scheme (like DES) rather than the slow public key methods. A second advantage is that the software component is sent to the reuse library and retrieved from the reuse library in encrypted form so that reusers cannot ignore authentication requirements. A third advantage is that the key associated with the conventional algorithm (the DES key) is encrypted so that adversaries cannot simply substitute a replacement key to accompany replacement text. A fourth advantage is that the present invention can work any of the current cryptographic standards, like DES, and potential standards, like skipjack. Alternatively, the present invention can utilize the current de facto standard, RSA, or other public key methods rather than RSA.

While the invention has been described in detail herein in accord with certain preferred embodiments thereof, modifications and changes therein may be effected by those skilled in the art. Accordingly, it is intended by the appended claims to cover all such modifications and changes as fall within the true spirit and scope of the invention.

What is claimed:

1. In a network of computers comprising at least one computer, the method for reusing software components that maintains the integrity and authenticity of the software components, said method comprising:
   generating an software component record using the following substeps:
   (a) encrypting a plaintext representation of a software component into a encrypted software component with a first cryptographic algorithm using first key;
   (b) hashing the encrypted software component to generate a first hash digest;
   (c) encrypting the first hash digest and the first key using a second cryptographic algorithm with a second key, wherein said second cryptographic algorithm is of a public key type and said second key is the private key associated with at least one public key, said software component record consisting of the encrypted software component, the encrypted hash digest, and the encrypted first key; storing the software component record in a reuse library;
   retrieving the software component record from the reuse library;
   generating the plaintext representation of the software component using the following substeps:
   (a) obtaining a public key associated with the second key from a public key directory;
   (b) decrypting the encrypted hash digest and the encrypted first key into the decrypted first key and the decrypted first hash digest using the public key and the second cryptographic algorithm;
   (c) hashing the encrypted software component to generate a second hash digest;
   (d) comparing the second hash digest with the decrypted first hash digest, and if not identical indicating that the software component is corrupted, if identical indicating that the software is not corrupted;
   (e) decrypting the encrypted software component into the plaintext representation using the decrypted first key and the first encryption algorithm.

2. The method of claim 1 wherein the Data Encryption Standard is used as the first cryptographic algorithm and the Digital Signature Algorithm is used as the second cryptographic algorithm.

3. The method of claim 1 wherein the Data Encryption Standard is used as the first cryptographic algorithm and the RSA is used as the second cryptographic algorithm.

4. The method of claim 1 wherein the Skipjack is used as the first cryptographic algorithm and the Digital Signature Algorithm is used as the second cryptographic algorithm.

5. The method of claim 1 wherein the Skipjack is used as the first cryptographic algorithm and the RSA is used as the second cryptographic algorithm.

6. The method of claim 1 wherein the software component record includes a descriptive plaintext component containing a description of the software component.

7. The method of claim 6 wherein the descriptive plaintext component includes information regarding data rights and ownership rights.

8. The method of claim 6 wherein the plaintext representation of the software component also includes information defining the software components relationship to other software component records in the reuse library.

9. The method of claim 7 wherein the plaintext representation of the software component also includes information defining the software components relationship to other software component records in the reuse library.

10. The computer system comprising:
a reuse library having a plurality of encrypted software components each software component record having an encrypted software component, an encrypted hash digest, and an encrypted first key;
said reuse library having a storage means for storing encrypted software components;
said reuse library having a retrieval means for retrieving encrypted software components;
a directory containing a list of publishers and an associated list of public keys;
at least one publisher's workstation coupled to the reuse library, said publishers workstation having
an first encrypting means for encrypting a plaintext representation of a software component into a encrypted software component with a first cryptographic algorithm using first key;
an hashing means for hashing the encrypted software component to generate a first hash digest;
a second encrypting means for encrypting the first hash digest and the first key using a second cryptographic algorithm with a second key, wherein said second cryptographic algorithm is of a public key algorithm type and said second key is the publisher's private key associated with a publisher's public key, said software component record consisting of the encrypted software component, the encrypted hash digest, and the encrypted first key;
a communications means for sending the software component record to the reuse library for storage by the storage means;
at least one reuser workstation coupled to the reuse library, said reuser workstation having
a requesting means for sending a request to the reuse library for a desired encrypted software component, wherein said request causes the retrieval means of the reuse library to retrieve the desired software component and send it to the requesting workstation;
a means for obtaining the public key from the directory, said public key associated with the second key of the desired encrypted software component;
a first decrypting means for decrypting the encrypted hash digest and the encrypted first key into the decrypted first key and the decrypted first hash digest using the public key and the second cryptographic algorithm;
an hashing means for hashing the encrypted software component to generate a second hash digest;
a comparing means for comparing the second hash digest with the decrypted first hash digest, and if not identical indicating that the software component is corrupted, if identical indicating that the software is not corrupted;
a second decrypting means for decrypting the encrypted software component into the plaintext representation using the decrypted first key and the first encryption algorithm.

11. The system of claim 10 wherein the reuser workstation also includes a display means for displaying the plaintext representation of the software component record and for providing an indication of corruption.

12. The system of claim 10 wherein the reuser workstation also includes a browsing means for browsing encrypted software components stored in the reuse library.

13. The system of claim 10 wherein the plurality of encrypted software components and the directory are stored in a relational database.

14. The system of claim 10 wherein the plurality of encrypted software components and the directory are stored in a object oriented database.

15. The system of claim 10 wherein the reuse library includes a catalogue means for assigning the software component record a unique identifier and for classifying the software component record.

16. The system of claim 15 wherein the catalogue means classifies the software component record according to a set of classification criteria.

17. The system of claim 10 wherein the Data Encryption Standard is used as the first cryptographic algorithm and the Digital Signature Algorithm is used as the second cryptographic algorithm.

18. The system of claim 10 wherein the Data Encryption Standard is used as the first cryptographic algorithm and the RSA is used as the second cryptographic algorithm.

19. The system of claim 10 wherein the Skipjack is used as the first cryptographic algorithm and the Digital Signature Algorithm is used as the second cryptographic algorithm.

20. The system of claim 10 wherein the Skipjack is used as the first cryptographic algorithm and the RSA is used as the second cryptographic algorithm.

* * * * *

UNITED STATES PATENT AND TRADEMARK OFFICE
CERTIFICATE OF CORRECTION

PATENT NO. : 5,343,527   Page 1 of 2

DATED : August 30, 1994

INVENTOR(S) : James W. Moore

It is certified that error appears in the above-indentified patent and that said Letters Patent is hereby corrected as shown below:

Title page, before item [57] Abstract, in the "Attorney, Agent or Firm" "Mark A. Wurm" to --John D. Flynn, Mark A. Wurm--.

Column 1, Line 17, change "theft" to --their-- (2 occurrences).

In Claim 1, Column 20, Line 13, change "an" to --a--.

In Claim 1, Column 20, line 17, change "a" to --an--.

In Claim 8, Column 21, line 10, change "components" to --component's--.

In Claim 9, Column 21, line 15, change "components" to --component's--.

In Claim 10, Column 21, line 31, change "an first" to --a first--.

In Claim 10, Column 21, line 32, change "into a" to --into an--.

In Claim 10, Column 21, line 35, change "an hashing means" to --a hashing means--.

In Claim 10, Column 22, line 9, change "an hashing means" to --a hashing means--.

UNITED STATES PATENT AND TRADEMARK OFFICE
CERTIFICATE OF CORRECTION

PATENT NO. : 5,343,527

DATED : August 30, 1994

INVENTOR(S) : James W. Moore

It is certified that error appears in the above-indentified patent and that said Letters Patent is hereby corrected as shown below:

In Claim 14, Column 22, line 33, change "a object oriented" to --an object oriented--.

Signed and Sealed this

Twenty-second Day of November, 1994

Attest:

BRUCE LEHMAN

Attesting Officer

Commissioner of Patents and Trademarks